United States Patent [19]

Swiderski et al.

[11] 3,994,608
[45] Nov. 30, 1976

[54] ADAPTER BETWEEN KNOB AND SHAFT

[75] Inventors: Felix J. Swiderski; James A. Buxton, Jr., both of Louisville, Ky.

[73] Assignee: General Electric Company, Louisville, Ky.

[22] Filed: Oct. 31, 1975

[21] Appl. No.: 627,604

[52] U.S. Cl. .............................. 403/372; 403/357; 403/377; 16/121; 74/553; 292/349
[51] Int. Cl.² ........................................ F16C 3/10
[58] Field of Search ........... 403/372, 361, 357, 375, 403/377; 16/121, 118; 74/553; 292/349

[56] References Cited
UNITED STATES PATENTS

| | | | |
|---|---|---|---|
| 2,080,361 | 5/1937 | Lindstrom | 403/357 |
| 2,256,419 | 9/1941 | Tinnerman | 403/361 X |
| 2,440,017 | 4/1948 | Nass | 403/357 |
| 3,130,990 | 4/1964 | Leitmann | 403/357 |
| 3,425,723 | 2/1969 | Parkin et al. | 403/372 |
| 3,430,994 | 3/1969 | Keeler | 403/372 |
| 3,730,571 | 5/1973 | Van Buren, Jr. | 403/361 |
| R26,769 | 1/1970 | Van Buren, Jr. | 403/361 |

*Primary Examiner*—Andrew V. Kundrat
*Attorney, Agent, or Firm*—Richard L. Caslin; Francis H. Boos

[57] ABSTRACT

A control component with a "D" shaped shaft is to be fitted with a control knob that was designed to fit onto a "dog-bone" shaped shaft. A resilient adapter in the form of a tubular sleeve has a special bore to fit on the shaft and a special configuration to fit into the bore of the knob so as to prevent relative rotational movement therebetween.

5 Claims, 4 Drawing Figures

ADAPTER BETWEEN KNOB AND SHAFT

BACKGROUND OF THE INVENTION

1. Field of the Invention

This invention relates to knobs that are mounted on the shaft of a control component, such as a multiple position selector switch or thermostat. Such components are widely used in major appliances such as electric ranges, air conditioners, clothes washers and dryers, and the like.

2. Description of the Prior Art

Frequently, resilient means are furnished with knobs to exert a frictional grip on the shaft of a control component and restrict relative movement therebetween. One example is in the Parkin et al., U.S. Pat. No. 3,425,723. This patent has a complex sleeve-like metal fastener which joins the knob to a "D" shaped shaft.

Another example of a resilient fastener or adapter is shown in the Van Buren U.S. Pat. No. Re. 26,769. It also has a complex sleeve-like fastener for coupling a molded plastic knob to a "D" shaped shaft of a control component.

However, neither of these prior art patents teach of a fastener or adapter for matching a knob that accommodates a "dog-bone" shaped shaft to a "D" shaped shaft.

The principal object of the present invention is to provide an adapter to convert a knob with a bore for mounting onto a "dog-bone" shaped shaft so as to fit onto a "D" shaped shaft to prevent relative rotational movement therebetween.

A further object of the present invention is to provide a resilient adapter of the class described which is capable of ease of assembly into the knob and onto the shaft while restricting relative rotational movement between the knob and the adapter, and between the adapter and the shaft.

A further object of the present invention is to provide an adapter of the class described with an oversized bore and an undersized periphery for ease of assembly, and is provided with strategically placed ridges that restrict relative rotational movements between the parts.

SUMMARY OF THE INVENTION

The present invention, in accordance with one form thereof, relates to a resilient adapter that is used for fastening a knob, with a bore for receiving a "dog-bone" shaped shaft, to a generally "D" shaped shaft. The adapter is a tubular sleeve with an oversized "D" shaped bore and an undersized periphery and longitudinal ridges to create a force-fit and prevent relative rotational movement between the parts.

BRIEF DESCRIPTION OF THE DRAWINGS

This invention will be better understood from the following description taken in conjunction with the accompanying drawings and its scope will be pointed out in the appended claims.

FIG. 2 is an exploded side view on a reduced scale of the combination of the control switch, the knob and the adapter of the present invention, and it shows the relative lengths of the shaft, the depth of the bore in the knob and the length of the adapter.

DESCRIPTION OF THE PREFERRED EMBODIMENT

Figure 1:
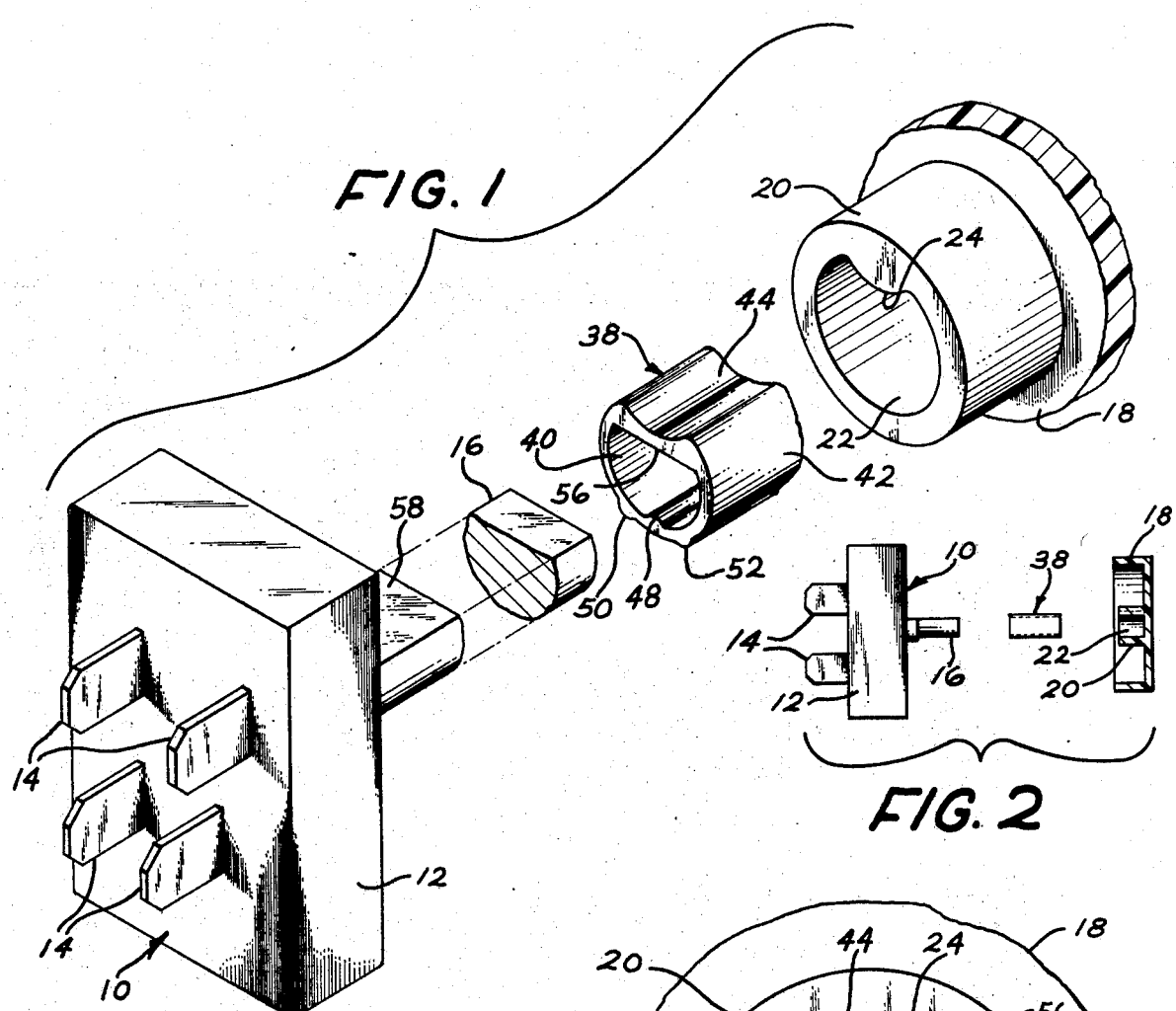
FIG. 1 is an exploded perspective view of a control component, such as a multiple selector switch, with a "D" shaped shaft and a fragmentary knob having a bore for receiving a "dog-bone" shaped shaft, as well as showing a portion of the resilient adapter of the present invention having a bore for accommodating the "D" shaped shaft and a periphery for receiving the bore of the knob.
Figure 3:
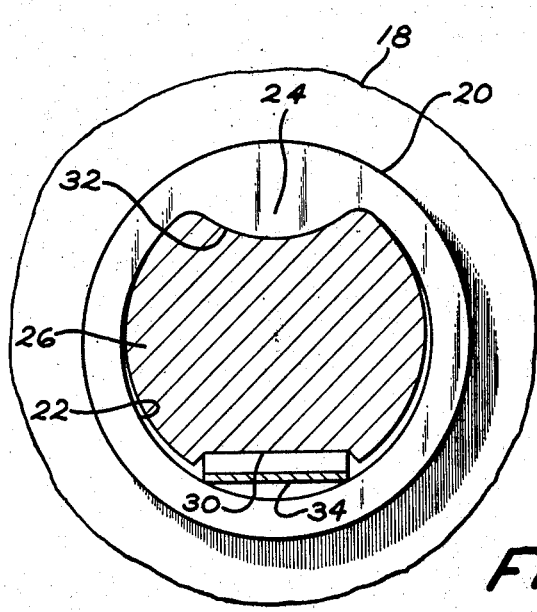
FIG. 3 is a cross-sectional view of the knob of FIG. 1 mounted on a "dog-bone" shaped shaft.

Turning now to a description of the drawings and in particular to FIG. 1, there is shown a control component 10, such as a multiple selector switch or thermostat, having a housing 12, electrical terminals 14 and a "D" shaped shaft 16. To be mounted on the shaft 16 is a knob 18 having a hub 20 with a bore 22. This bore 22 is in the form of a circular cylinder having a longitudinal projection 24 that serves as a key to mate with one side of a "dog-bone" shaft, such as shaft 26 in FIG. 3. The "dog-bone" shaft 26 is generally circular in shape except it has two diametrically-opposed grooves or slots 30 and 32. The groove 30 accommodates a leaf spring 34 which serves to exert outward force and frictionally grip the bore 22 of the knob 18. The other groove 32 serves as a keyway to receive the longitudinal projection 24 with a wide area of contact.

It is easy to appreciate that the "D" shaped shaft 16 cannot accommodate the bore 22 of the knob 18 and avoid relative rotational movement between each other. They were not designed to work together. Most control components, such as switches and thermostats, have been made in the past with shafts of "D" shape or "dog-bone" shape in transverse cross-section. A manufacturer using such components in his appliances will order special knobs to fit the particular shaft of the components. A serious logistics problem arises in the product service of manufacturers' products in the consumers' homes over the life span of the appliance; for example, on the order of between 10 and 20 years.

If a defective component were a selector switch on an electric range, the service technician would have to stock in his service truck selector switches with both kinds of shafts, a "D" shaft and a "dog-bone" shaft in order to put the equipment back in service on the first service call. This is necessary because the consumer would want to retain the same knob which came with the range.

Figure 4:
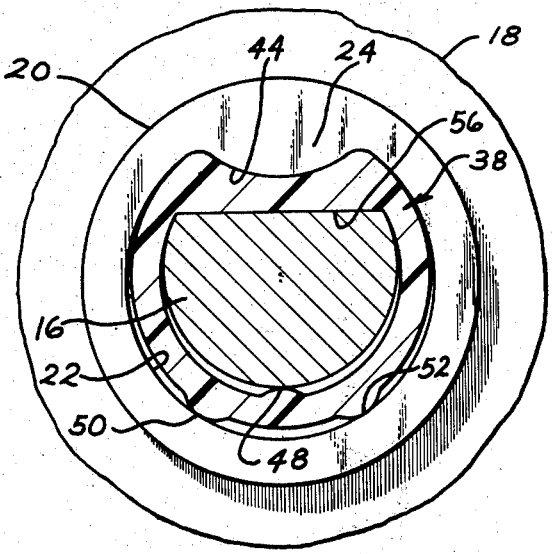
FIG. 4 is a cross-sectional view of the "D" shaped shaft of FIG. 1 fitted with the resilient adapter of the present invention and supporting the knob of FIG. 1.

The present invention relates to a resilient adapter 38 that is formed as a molded extrusion of nylon material or the like. It is a tubular sleeve of about ¾ inches in length with a "D" shaped bore 40 and a circular periphery 42 having a longitudinal depression 44 for mating with the longitudinal projection 24 of the bore 22 of the knob 18. The "D" shaped bore 40 is slightly oversized when compared with the size of the "D" shaft 16, as is best seen in FIG. 4. The circular periphery 42 of the sleeve is slightly undersized when compared with the bore 22 of the knob 18, as is best seen in FIG. 4. This sizing of the sleeve 38 is necessary because of the dimensional tolerances in manufactured parts. It is important that the sleeve 38 fits easily on the shaft 16 and into the bore 22 of the knob 18.

It is necessary to provide means to restrict relative rotational movement between the knob 18 and the shaft 16. Longitudinal ridges 48, 50 and 52 are formed on the sleeve 38 to create a force-fit between the sleeve 38 and shaft 16, and between the sleeve 38 and the bore 22 of the knob 18. The bore 40 of the sleeve 38 is provided with a single longitudinal ridge 48 that is shown opposite the flat side 56 of the "D" shaped bore 40 of the sleeve. There is wide area contact between the flat side 58 of the shaft 16 and the flat side 56 of the bore 40 of the sleeve 38. There is also wide area contact between the longitudinal depression 44 of the sleeve and the longitudinal projection 24 of the bore 22 of the knob. Longitudinal ridges 50 and 52 are formed on the exterior of the sleeve 38 adjacent the interior ridge 48.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. A resilient adapter used for fastening a knob to a shaft, said knob having a bore for receiving a "dog-bone" shaped shaft and the shaft being of generally "D" shaped cross-section, said adapter comprising a tubular sleeve with a "D" shaped bore and a circular periphery having a longitudinal depression adjacent the flat side of the bore, the bore of the sleeve being slightly oversized and the circular periphery of the sleeve being slightly undersized, and internal and external longitudinal ridges formed on the sleeve and adapted to create a force-fit between the "D" shaped shaft and the adapter as well as between the adapter and the bore of the knob.

2. A resilient adapter as recited in claim 1 wherein there is at least one longitudinal ridge within the bore of the sleeve in the area away from the flat side of the bore, and there are at least two longitudinal ridges on the periphery of the sleeve in the vicinity of the internal ridge.

3. A resilient adapter as recited in claim 1 wherein there is at least one internal ridge that is diametrically opposite the flat side of the bore and adapted to restrict relative rotational movement between a "D" shaft and the sleeve, and there are at least two longitudinal ridges on the periphery of the sleeve closely adjacent the internal ridge and adapted to restrict relative rotational movement between a knob and the sleeve.

4. A resilient adapter as recited in claim 1 in combination with a knob having a bore for receiving a "dog-bone" shaped shaft and a shaft having a generally "D" shaped cross-section for receiving the adapter thereon, wherein there is a wide area contact between the flat side of the "D" shaped shaft and the flat side of the bore of the sleeve, and there is wide area contact between the longitudinal depression in the periphery of the sleeve and the mating area of the bore of the knob.

5. The invention of claim 4 wherein there is at least one longitudinal ridge within the bore of the sleeve to restrict relative rotational movement between the shaft and the sleeve, and there are at least two longitudinal ridges on the periphery of the sleeve to restrict relative rotational movement between the knob and the sleeve.

* * * * *